A. GARELLI.
CHANGE SPEED GEAR.
APPLICATION FILED JUNE 11, 1920.
1,425,002.
Patented Aug. 8, 1922.
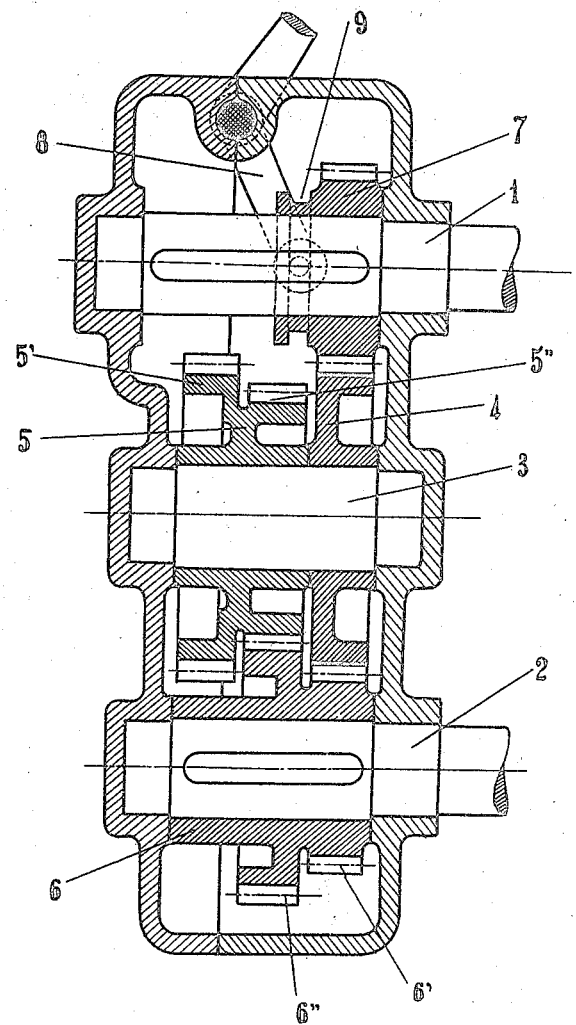
Inventor:
Adalberto Garelli
By [signature]
Attorney

UNITED STATES PATENT OFFICE.

ADALBERTO GARELLI, OF MILAN, ITALY.

CHANGE-SPEED GEAR.

1,425,002.   Specification of Letters Patent.   Patented Aug. 8, 1922.

Application filed June 11, 1920. Serial No. 388,341.

(GRANTED UNDER THE PROVISIONS OF THE ACT OF MARCH 3, 1921, 41 STAT. L., 1313.)

*To all whom it may concern:*

Be it known that I, ADALBERTO GARELLI, a subject of the King of Italy, residing at Milan, Italy, have invented certain new and useful Improvements in Change-Speed Gears, of which the following is a specification.

This invention comprises a change speed gear in which the transmission between a driving shaft and a driven shaft is made through one or more pinions which are loosely mounted on an intermediate shaft and at least one of which has two toothed rims, one rim meshing with a pinion fast on the driven shaft, and the other rim is adapted to be engaged by a pinion which rotates with but is slidably mounted on the driving shaft.

A construction of the change speed gear according to the invention is illustrated by way of example in the accompanying drawing, in section through the axes of the shafts.

In said construction between the driving shaft 1 and the driven shaft 2 is mounted an intermediate shaft 3 on which are loosely mounted two pinions 4, 5. The pinion 4 has a single toothed rim whilst the other 5 has two toothed rims 5′ and 5″ one of which has the same diameter as the toothed rim of the pinion 4 whilst the other rim has a diameter depending on the ratio of transmission required.

To the driven shaft 2 is keyed a pinion 6 which, opposite the toothed rim of the pinion 4 and opposite the rim 5″ of the other pinion, has rims 6′, 6″ always in engagement with the rims 4 and 5″.

On the shaft 1 is keyed a slidable pinion 7 which can engage with the pinion 4 as well as with the rim 5′ of the other pinion, and the change of speed is obtained by shifting the pinion 7 on the shaft 1, which is done, for example, by means of an ordinary fork 8 engaging a groove 9 of said pinion.

When the pinion 7 is in engagement with the pinion 4, rotation of the shaft 1 is transmitted at the same speed to the shaft 2 through the intermediate pinion 4, the pinion 6 at the same time driving the loose pinion 5. If the pinion 7 is carried in mesh with rim 5′, the rotation of the pinion 5 is transmitted to the shaft 2 by rim 5″ engaging rim 6″, that is to say in a ratio depending on the diameters of said rims, whilst the pinion 4 rotates loosely being driven by the rim 6′.

It is to be understood that on the shaft 3 may be loosely mounted other pinions each of which, like the pinion 5, has a toothed rim of the same diameter as the pinion 4, and another rim of a different diameter engaging a suitable pinion on the shaft 2; this allows of obtaining any desired number of ratios of transmission and of passing from one to another by simply shifting pinion 7.

What I claim as my invention and desire to secure by United States Letters Patent is:—

1. A change-speed gear, comprising a driving shaft; a driven shaft; a pinion slidably fixed to the driving shaft; shifting means for said pinion; an intermediate shaft; a plurality of loose pinions on the intermediate shaft; at least one loose pinion having two toothed rims, one of which is adapted to be engaged by the slidable pinion on the driving shaft; and a plurality of toothed elements mounted on the driven shaft to rotate therewith, each of said toothed elements meshing with one of the loose pinions on the intermediate shaft.

2. A change-speed gear, comprising a driving shaft; a driven shaft; a pinion slidably fixed to the driving shaft; shifting means for said pinion; an intermediate shaft; a plurality of loose pinions on the intermediate shaft; at least one loose pinion having a pair of toothed rims, and another loose pinion having solely one toothed rim, one rim of the pair of toothed rims being engageable by the slidable pinion on the driving shaft; and a plurality of toothed elements mounted on the driven shaft to rotate therewith, each of said toothed elements meshing with one of the loose pinions on the intermediate shaft.

3. A change speed gear comprising a driving shaft, a pinion mounted to rotate with said driving shaft and movable along the same, means for shifting said pinion, an intermediate shaft, a pinion loose on said intermediate shaft and comprising two toothed rims, one of said toothed rims being adapted to be engaged by the pinion on the driving shaft, a second pinion loose on said intermediate shaft and having a single rim adapted to be engaged by the said pinion on the driving shaft, a driven shaft and two toothed rims solid with said driven shaft, one engaging the other rim of the first named loose pinion and the other one engaging the single toothed rim of the second named loose pinion.

In testimony whereof I affix my signature.

ADALBERTO GARELLI.